United States Patent

Takeuchi

[11] Patent Number: 6,144,477
[45] Date of Patent: Nov. 7, 2000

[54] SCANNING OPTICAL SYSTEM

[75] Inventor: Shuichi Takeuchi, Saitama, Japan

[73] Assignee: Asahi Kogaku Kogyo Kabushiki Kaisha, Tokyo, Japan

[21] Appl. No.: 09/358,887

[22] Filed: Jul. 22, 1999

[30] Foreign Application Priority Data

Jul. 24, 1998 [JP] Japan .................... 10-209901

[51] Int. Cl.$^7$ .................... G02B 26/08
[52] U.S. Cl. .................... 359/207; 359/205; 359/206; 359/216
[58] Field of Search .................... 359/205, 206, 359/207, 216, 217, 218; 358/474; 347/230

[56] References Cited

U.S. PATENT DOCUMENTS

| | | | |
|---|---|---|---|
| 4,866,459 | 9/1989 | Tokita et al. . | |
| 5,189,546 | 2/1993 | Iizuka . | |
| 5,200,850 | 4/1993 | Iizuka | 359/206 |
| 5,453,870 | 9/1995 | Iima | 359/205 |
| 5,737,112 | 4/1998 | Iizuka . | |
| 5,781,324 | 7/1998 | Nishina | 359/206 |
| 5,815,301 | 9/1998 | Naiki | 359/205 |
| 5,838,480 | 11/1998 | McIntyre | 359/205 |
| 5,963,355 | 10/1999 | Iizuka . | |
| 6,038,053 | 3/2000 | Kato | 359/205 |

FOREIGN PATENT DOCUMENTS

| | | |
|---|---|---|
| 61-147211 | 7/1986 | Japan . |
| 61-175607 | 8/1986 | Japan . |
| 6015594 | 8/1996 | Japan . |

*Primary Examiner*—Cassandra Spyrou
*Assistant Examiner*—Leo Boutsikaris
*Attorney, Agent, or Firm*—Greenblum & Bernstein, P.L.C.

[57] ABSTRACT

In a scanning optical system where a bundle of rays scans a surface to be scanned through an optical deflector and an image forming optical system, the image forming optical system includes a positive front lens group having two lens elements and a rear lens group constituted by an elongated single anamorphic lens element having a strong positive refractive power in the sub scanning direction. All the lens elements in the image forming optical system are made of a resin material, and the scanning optical system satisfies the conditions: (1)$d_0/f<0.23$ (2) $0.70<f/f_1<1.30$ (3)$d_{fB}/f<0.50$ wherein f designates the focal length of the image forming optical system in the main scanning direction; $f_1$ designates the focal length of the first lens element of the front lens group; $d_0$ designates the distance from the intersecting point of the optical axis of the bundle of rays being emitted from the light source and incident on the optical deflector and the optical axis of the image forming optical system to the first lens surface, on the side of the optical deflector, of the image forming optical system; and $d_{fB}$ designates the distance between the surface to be scanned and the last lens surface of the rear lens group closest to the surface to be scanned.

8 Claims, 11 Drawing Sheets

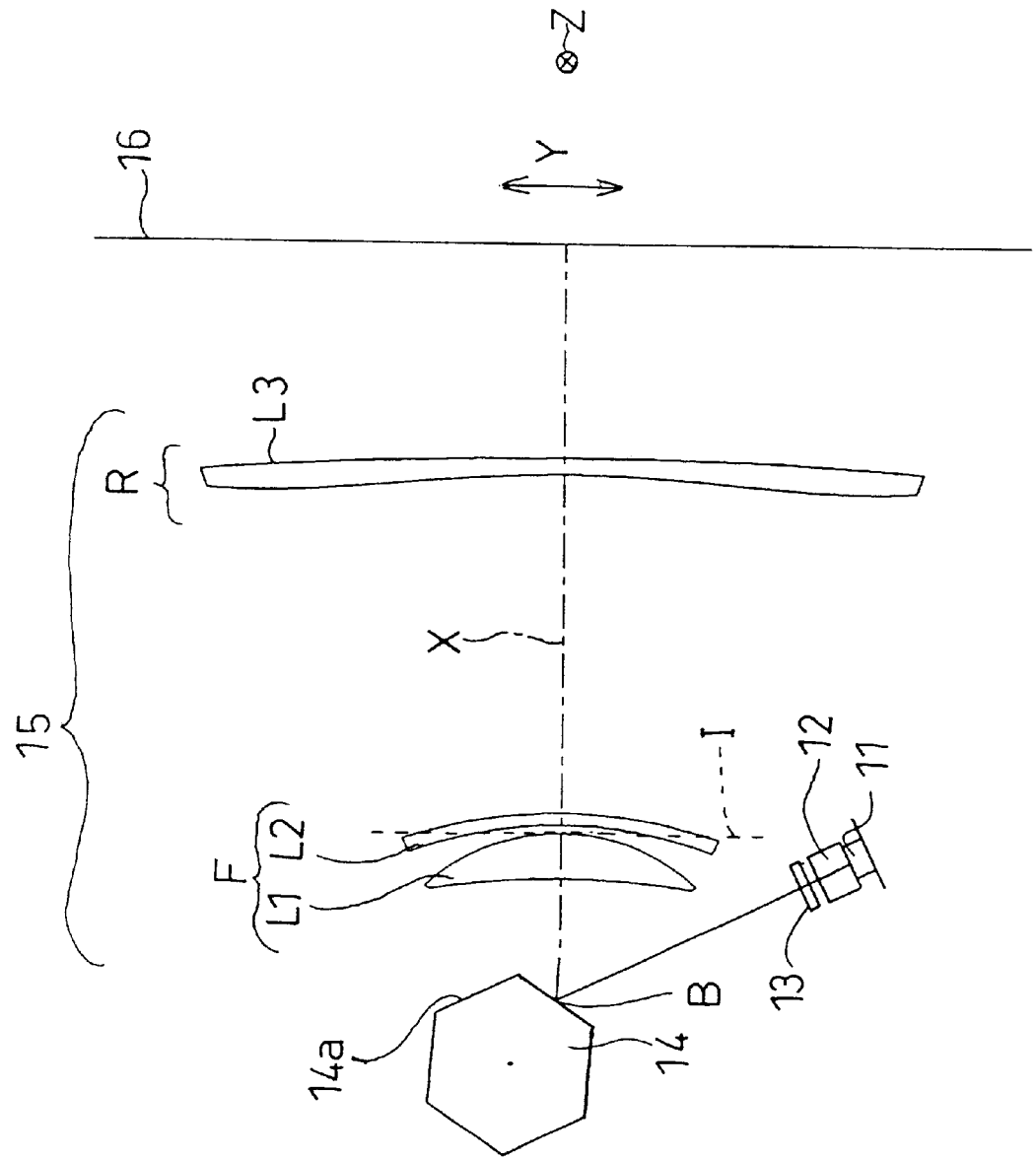

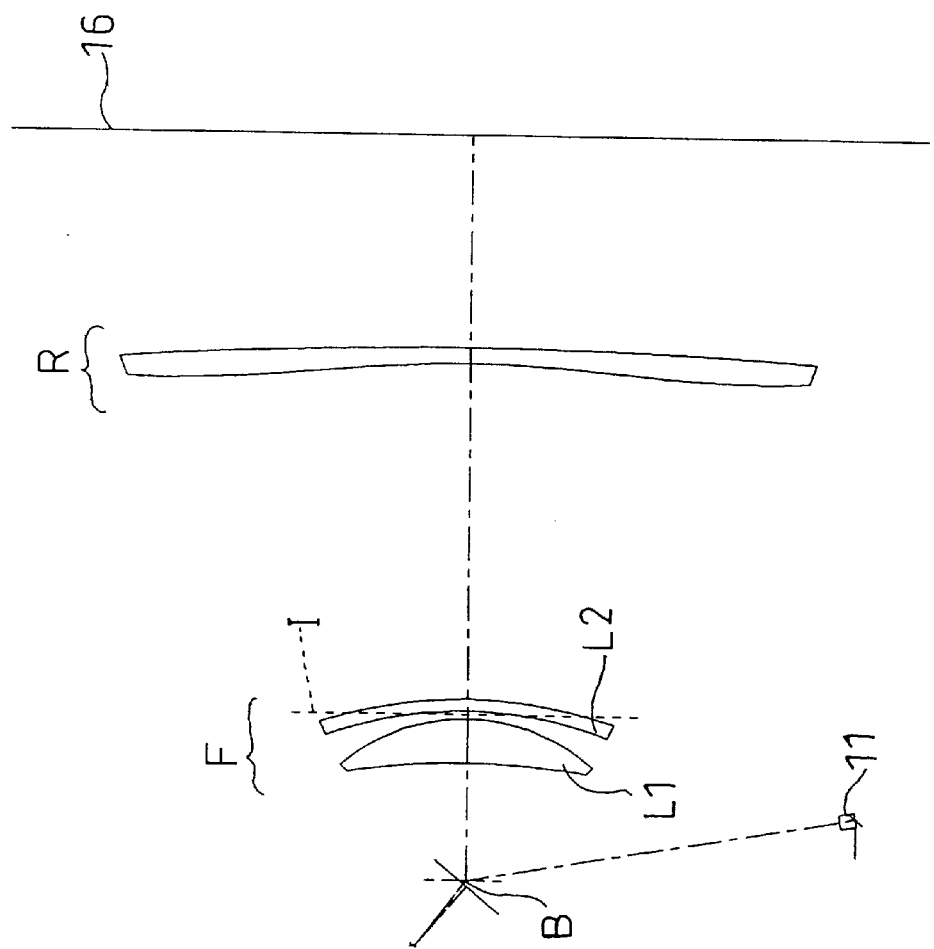

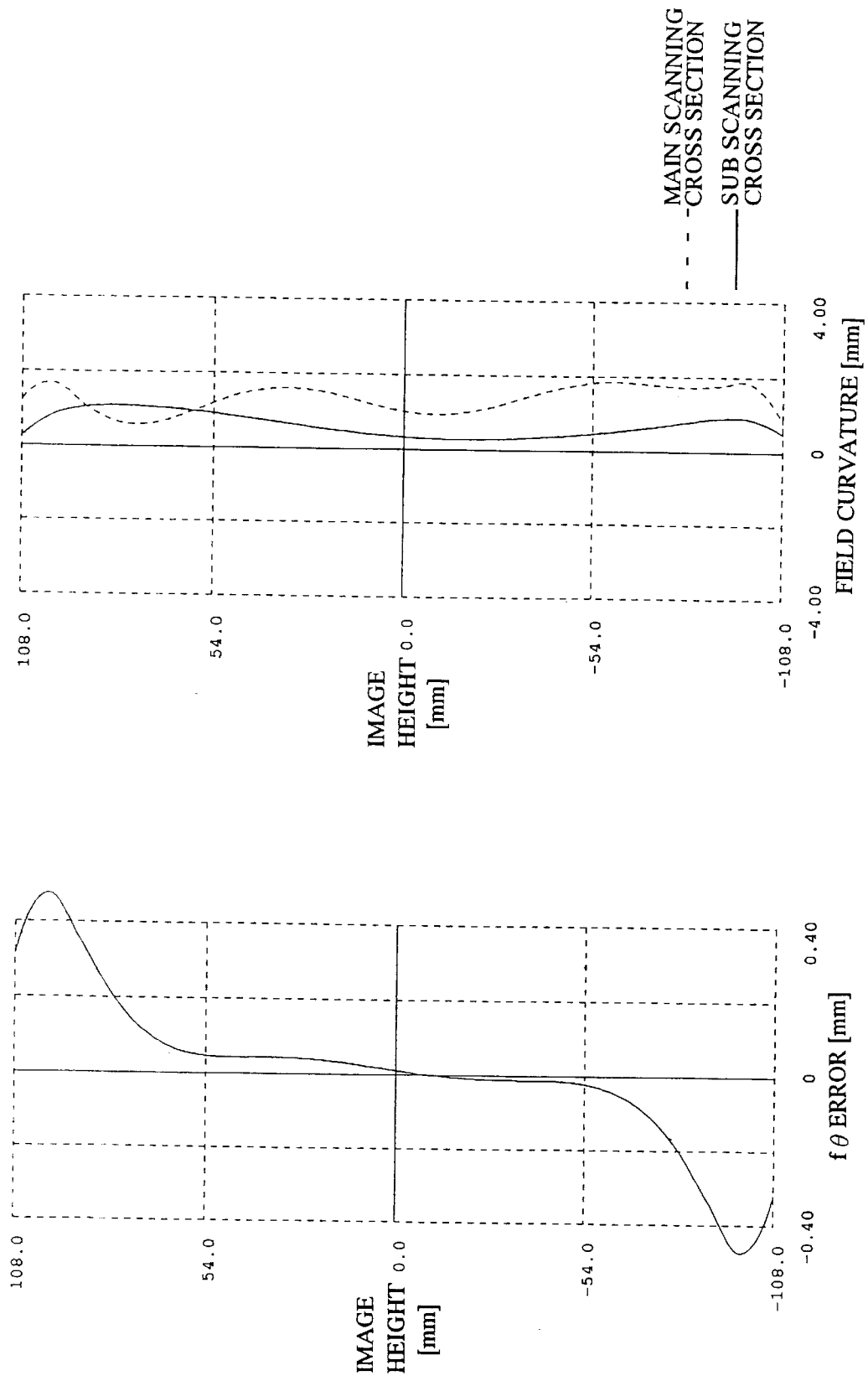

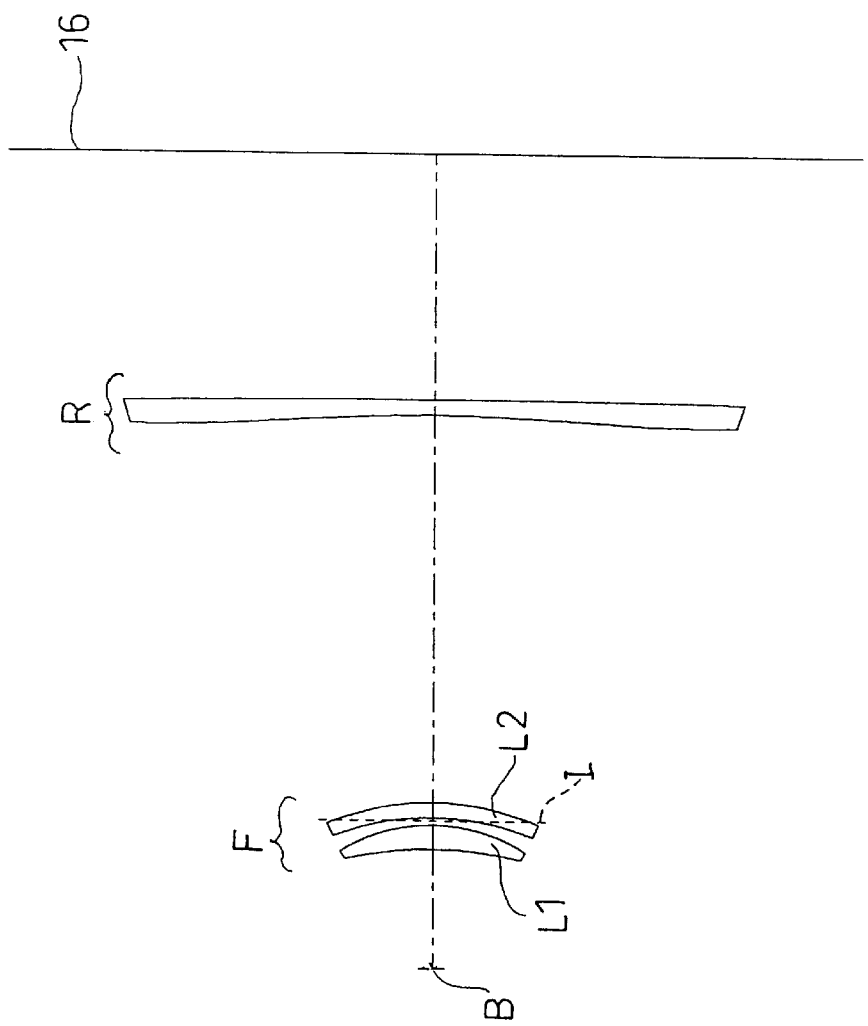

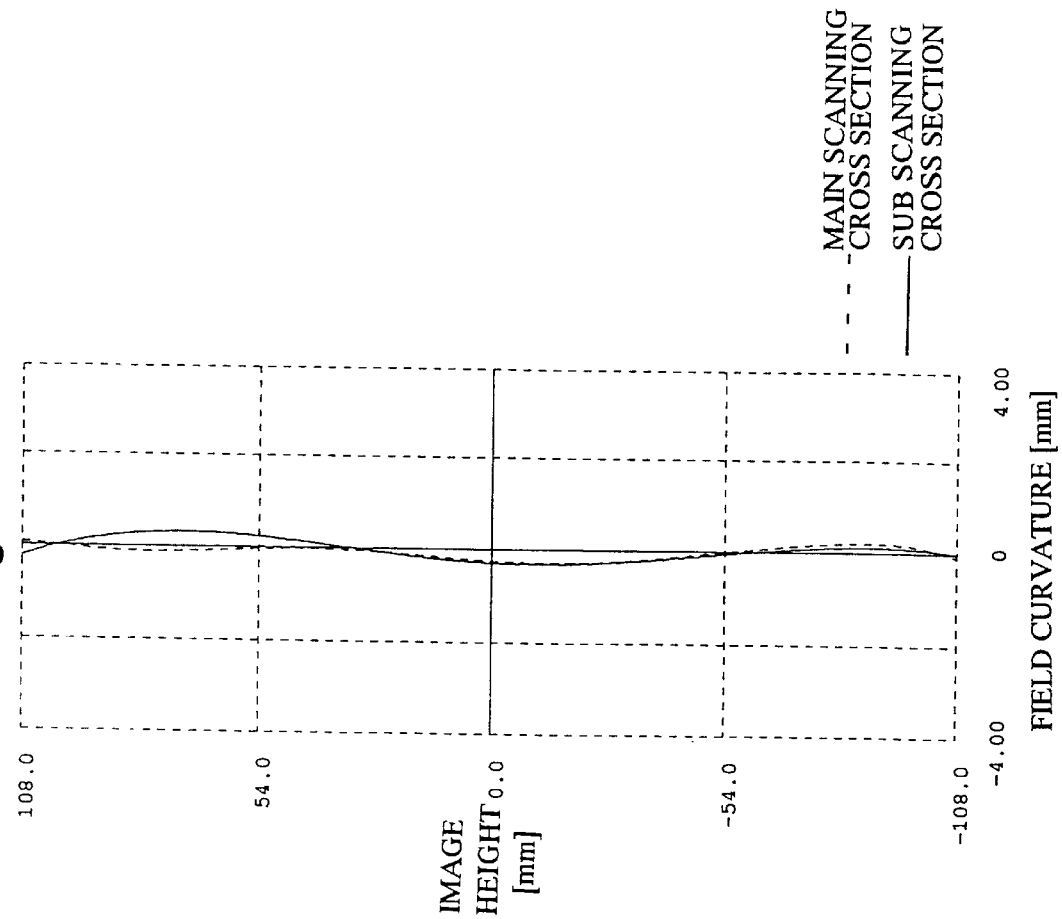
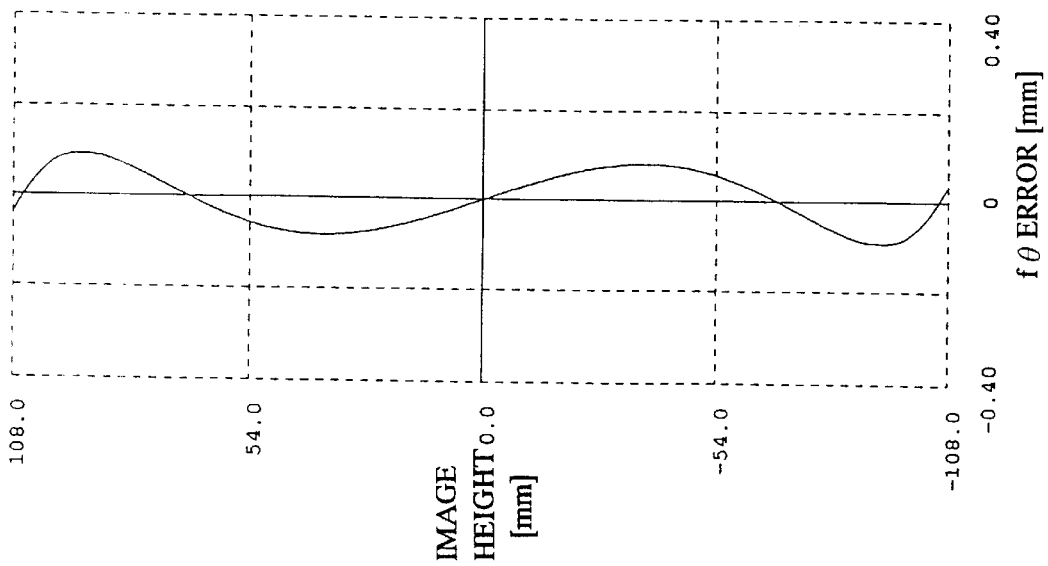

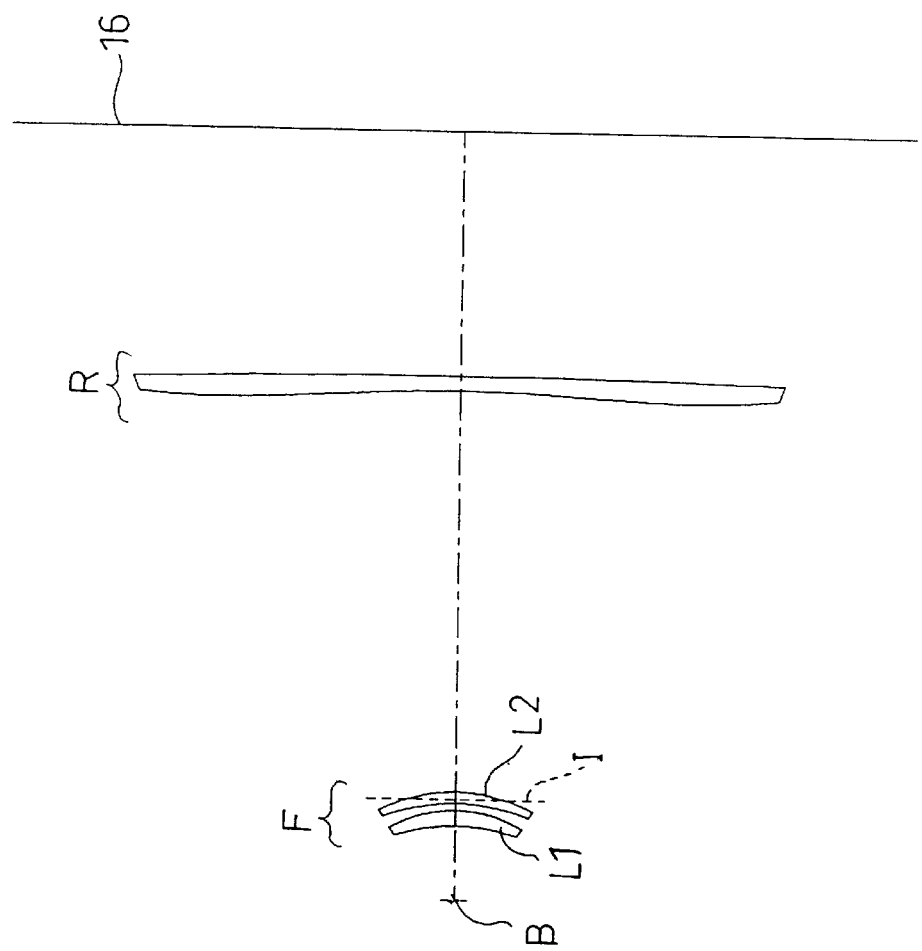

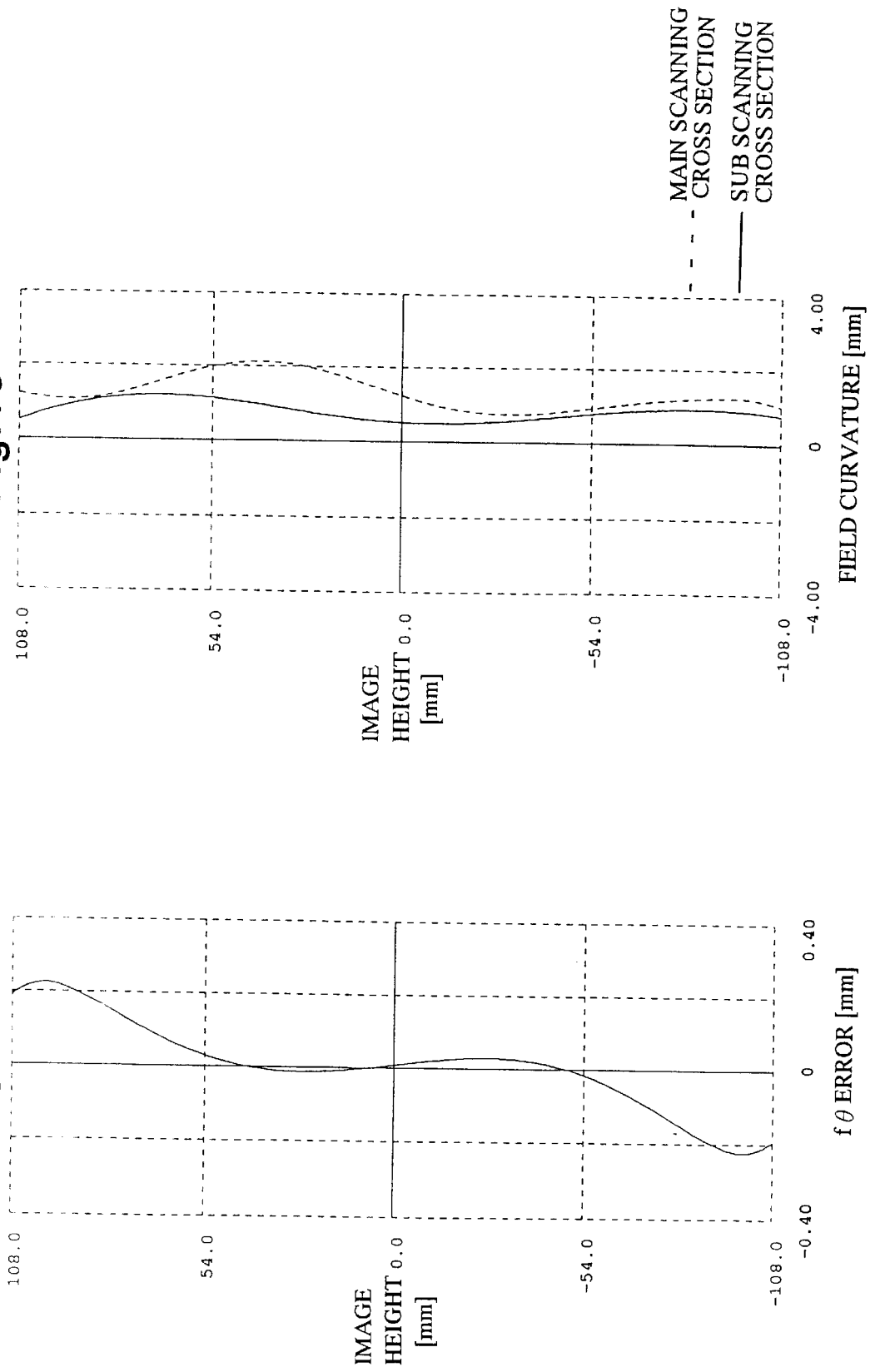

SCANNING OPTICAL SYSTEM

BACKGROUND OF THE INVENTION

1. Field of the Invention

The present invention relates to a scanning optical system utilized in a laser beam printer and the like, and in particular, relates to the image forming optical system thereof (fθ lens optical system).

2. Description of the Related Art

A resin-made lens element, which can be molded by large amounts, has frequently been used as an fθ lens element in a laser beam printer and the like. However, the change in the shape or refractive index of a resin material, caused by a change in temperature, is generally large. Therefore a device which utilizes such an optical plastic material suffers deteriorated performance due to the temperature change, such as deviation of an image forming position, the change in a position of a scanning spot (image height) in the main scanning direction, which have been paid attention to as problems to be solved.

In the prior art, even if at the design stage the values are determined to satisfactorily correct the fθ characteristics and field curvature, once the temperature changes, the fθ characteristics deteriorate, and subsequently, field curvature becomes worse, whereby the position of the image plane, especially the position of the image plane in the sub-scanning direction, is moved by a large amount, and hence, desired performance is not obtained.

There are products to cope with the above performance deterioration due to the temperature change, the products of which incorporate glass lens elements into a part of an optical system or provide a temperature detection mechanism to perform dynamic correction. However, glass lens elements are more expensive than resin-made lens elements, and a device, such as a temperature detection mechanism, causes a rise in the overall cost.

SUMMARY OF THE INVENTION

It is an object of the present invention to provide an image forming optical system of a scanning optical system in which performance deterioration due to the temperature change can be prevented while only using resin-made lens elements.

The present invention is made to overcome problems which have frequently been seen in various optical plastic materials: when the temperature rises, the refractive index decreases, and the curvature of an optical element also decreases due to expansion, so that the refractive power becomes weak. In a scanning optical system where a bundle of ray from a light source scans a surface to be scanned (hereinafter, photoconductive surface) through an optical deflector and an image forming optical system, when a light ray of a large scan angle is refracted by a large amount at the image forming optical system to obtain the fθ characteristics, the height of an image formed by the image forming optical system is susceptible to the change in the refractive power of an optical plastic material due to the temperature change whereby the image height is vulnerable to varying. On the other hand, the inventor of the present invention learns that when the image-side principal plane of the image forming optical system is moved towards the deflection reference point (the intersecting point of the central axis of light beam coming from the light source and being incident on the optical deflector, and the optical axis of the image forming optical system), distortion which satisfies the fθ characteristics can be obtained without largely refracting a light ray of a large scan angle. Through the positioning of the image-side principal plane of the image forming optical system, an influence on the change in the refractive index due to the temperature change is reduced.

The terms used herein are defined as follows:

The scan angle is defined as an angle which is formed, in the main scanning cross section, by the central axis of light beam reflected by an optical deflector and the optical axis of an image forming optical system;

The main scanning cross section is defined as a plane including the optical axis of the image forming optical system and a principal ray of a scanning beam;

The sub scanning cross section is defined as a plane including the optical axis and is perpendicular to the main scanning cross section;

The main scanning direction is defined as a direction in which the scanning beam moves on a plane perpendicular to the optical axis; and The sub scanning direction is defined as a direction which is perpendicular to the main scanning direction on the plane perpendicular to the optical axis.

To achieve the object mentioned above, there is provided a scanning optical system in which a bundle of ray from a light source scans a photoconductive surface through an optical deflector and an image forming optical system. The image forming optical system includes a positive front lens group having two lens elements and a rear lens group constituted by an elongated single anamorphic lens element positioned in the vicinity of the photoconductive surface and having a strong positive refractive power in the sub scanning direction. Furthermore, all the lens elements in the image forming optical system are made of a resin material, and the scanning optical system satisfies the following conditions:

$$d_0/f < 0.23 \tag{1}$$

$$0.70 < f/f_1 < 1.30 \tag{2}$$

$$d_{fB}/f < 0.50 \tag{3}$$

wherein f designates the focal length of the image forming optical system in the main scanning direction;

$f_1$ designates the focal length of the first lens element of the front lens group;

$d_0$ designates the distance from the intersecting point of the central axis of light beam being emitted from the light source and incident on the optical deflector and the optical axis of the image forming optical system to the first lens surface of the image forming optical system, i.e., the lens surface closest to the optical deflector; and $d_{fB}$ designates the distance between the photoconductive surface and the last lens surface of the rear lens group, the last lens surface of which is closest to the photoconductive surface.

Furthermore, the scanning optical system preferably satisfies the following condition:

$$d_{H2}/d_{IM} < 0.35 \tag{4}$$

wherein $d_{H2}$ designates the distance from the intersecting point of the central axis of light beam being emitted from the light source and incident on the optical deflector and the optical axis of the image forming optical system to the image-side principal plane of the image forming optical system; and $d_{IM}$ designates the distance between the image-side principal plane of the image forming optical system and the photoconductive surface.

Preferably, all of the lens surfaces of the front lens group are rotationally symmetrical about the optical axis thereof for the purpose of manufacturing the lens elements with ease and cost reduction. Moreover, if at least one lens surface of the front lens group is formed as an aspherical surface in the main scanning cross section, the f θ characteristics and field curvature are advantageously corrected at the same time.

The scanning optical system preferably satisfies the following condition:

$$-0.25 < f/f_R < 0 \quad (5)$$

wherein $f_R$ designates the focal length of the rear lens group in the main scanning direction.

The two lens elements constituting the front lens group can be both positive lens elements. Alternatively, the two lens elements of the front lens group can be a positive lens element and a negative lens element respectively.

The image forming optical system according to the present invention preferably includes at least one lens surface which satisfies the following condition:

$$\theta in - \theta out < -1.5° \quad (6)$$

wherein

θin designates the angle (absolute value) formed by the light ray of the maximum scan angle incident on a lens surface in the front lens group and the optical axis; and θout designates the angle (absolute value) formed by the light ray of the maximum scan angle emitted from the lens surface and the optical axis.

The present disclosure relates to subject matter contained in Japanese Patent Application No.10-209901 (filed on Jul. 24, 1998) which is expressly incorporated herein by reference in its entirety.

BRIEF DESCRIPTION OF THE DRAWINGS

The invention will be discussed below in detail with reference to the accompanying drawings, in which:

FIG. 1 is a schematic drawing of a scanning optical system according to the present invention;

FIG. 2 is a lens arrangement of the first embodiment of the present invention;

FIG. 5 shows the fθ error after a temperature change of 30° C. in the lens system of FIG. 2;

FIG. 6 shows field curvature after a temperature change of 30° C. in the lens system of FIG. 2;

FIG. 7 is a lens arrangement of the second embodiment of the present invention;

FIG. 8 shows the fθ error of the lens system in FIG. 7;

FIG. 9 shows field curvature of the lens system in FIG. 7;

FIG. 12 is a lens arrangement of the third embodiment of the present invention;

FIG. 15 shows the fθ error after a temperature change of 30° C. in the lens system of FIG. 12;

FIG. 16 shows the field curvature after a temperature change of 30° C. has occurred in the lens system of FIG. 12;

DESCRIPTION OF THE PREFERRED EMBODIMENT

Figure 4:
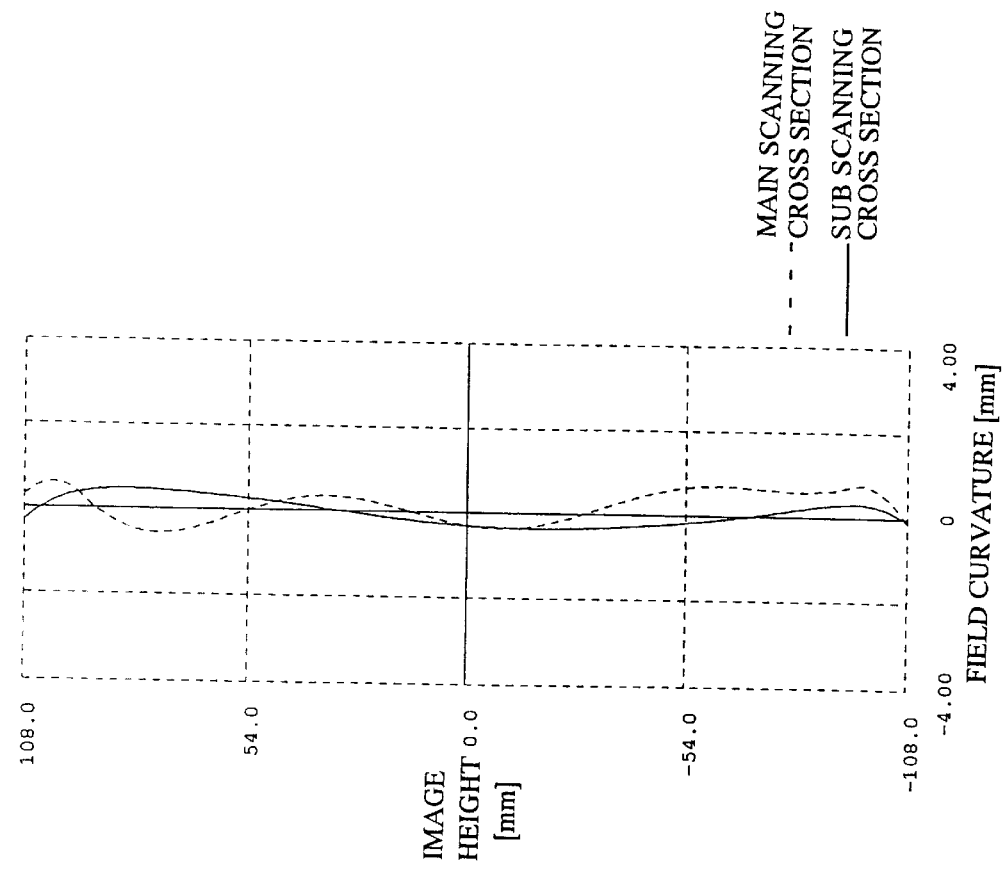
FIG. 4 shows field curvature of the lens system in FIG. 2.

FIG. 1 is a schematic drawing of a scanning optical system according to the present invention. A laser beam emitted from the laser diode (LD) light source 11 is collimated by the collimator lens element 12 into parallel laser beam. The parallel laser beam is incident on a cylindrical lens element 13 and then formed into a linear image being long in the main scanning direction. The laser beam in the form of the liner image is incident on a reflection surface 14a of a rotatable polygonal mirror (an optical deflector) 14, and the laser beam scans a photoconductive surface (a surface to be scanned) 16 in accordance with the rotation of the polygonal mirror 14. Further, there is provided an image forming optical system (fθ lens system) 15 whereby the rotational angle of the polygonal mirror 14 and an image height are adjusted to be proportional to perform a scanning operation. The main scanning direction is perpendicular to the optical axis of the image forming optical system 15 and parallel to the page of FIG. 1, and the sub-scanning direction is perpendicular thereto. The intersecting point of the central axis of light beam emitted from the laser light source 11 and incident on the optical deflector and the optical axis of the image forming optical system 15 is indicated as the deflection reference point B, and the image-side principal plane of the image forming optical system is indicated as "I".

The image forming optical system 15 includes a positive front lens group F having two lens elements L1 and L2 and a rear lens group R having an elongated single anamorphic lens element L3 positioned in the vicinity of the photoconductive surface 16 and having a strong positive power in the sub scanning direction. Furthermore, all the lens elements in the image forming optical system are made of an optical plastic material.

All of the lens surfaces of the lens elements L1 and L2 constituting the front lens group F are made to be rotationally symmetrical about the optical axis, whereby sensitivity to decentering can be reduced in the front lens group, and processing and assembling thereof can be made easier. Moreover, with at least one lens surface of the lens elements L1 and L2 being formed as an aspherical surface, it is preferable to correct the fθ characteristics and field curvature of the main scanning cross section at the same time.

Since the rear lens group R having a strong positive power in the sub scanning direction is constituted by an elongated single anamorphic lens element L3 and is positioned in the vicinity of the photoconductive surface 16, the correcting of facet tilt error, such as the correcting of scan line displacement caused by a tilt of a reflection surface of the polygonal mirror 14, can be made while the configuration change of the sub scanning image plane due to temperature is reduced.

Condition (1) specifies the condition to position the first lens element L1 of the front lens group F close to the deflection reference point B. When condition (1) is satisfied, the image-side principal plane "I" of the image forming optical system 15 can be moved close to the deflection reference point B.

If $d_0/f$ exceeds the upper limit of condition (1), it becomes difficult to position the image-side principal plane "I" of the image forming optical system 15 close to the deflection reference point B. As a result, a change in refractive power due to a change in temperature increases whereby the image height is varied.

Condition (2) specifies the refractive power of the positive first lens element L1, on the side of the deflection reference point B, of the front lens group F of the imaging optical system 15. As explained above, if the image forming optical system 15 is moved towards the deflection reference point B, the image-side principal plane "I" of the image forming optical system 15 can be positioned close to the deflection reference point B. However, there is a limit where the movement of the image forming optical system 15 towards the deflection reference point B is mechanically impossible. It is therefore preferable to move the image-side principal plane "I" towards the deflection reference point B by another way. Then, in the front lens group F constituted by the positive first lens element L1 and the second lens element L2, most of converging refractive power of the entire front lens group F is given to the positive first lens element L1 which is positioned on the side of the deflection reference point B, whereby the image-side principal plane "I" can much more be moved towards the deflection reference point B.

If one lens element is made to have a large refractive power, the ratio of the thickness of the center of the lens element to the thickness of the periphery thereof increases, which makes the molding thereof difficult. If the front lens group F is constituted by the two lens elements L1 and L2 both of which have a positive refractive power, the refractive power is distributed over the two lens elements L1 and L2, which makes the molding thereof easier. On the other hand, if the front lens group F is constituted by the two lens elements L1 and L2 each of which has a strong positive refractive power and a negative refractive power, it is disadvantageous for the first lens element L1 from the view point of molding; however, the image-side principal plane "I" can much more be moved towards the deflection reference point B.

When condition (2) is satisfied, (i) the image-side principal plane "I" can much more be moved towards the deflection reference point B, (ii) the ratio of the thickness of the center of the lens element to the thickness of the periphery thereof can be maintained so as not to become too large, and (iii) an increase of sensitivity to error in the lens element-shapes and a disadvantage on processing and molding can be prevented.

If $f/f_1$ exceeds the lower limit of condition (2), it becomes difficult to move the image-side principal plane "I" towards the deflection reference point B. Consequently, a change in refractive power due the temperature change becomes large, which causes the change in the image height. If $f/f_1$ exceeds the upper limit of condition (2), the ratio of the thickness of the center of the lens element to the thickness of the periphery thereof becomes larger, so that processing and molding with high precision become difficult.

Condition (3) specifies the ratio of the distance between the photoconductive surface 16 and the last lens surface of the rear lens group R to the focal length of the image forming optical system in the main scanning direction.

When condition (3) is satisfied, (i) sensitivity to deterioration in optical performance with respect to error in the lens element-shape of the rear lens group R is reduced, (ii) processing is made easier, and (iii) fluctuations in field curvature and in the position of the image plane due to the temperature change in the sub scanning cross section is reduced.

If $d_{fB}/f$ exceeds the upper limit of condition (3), sensitivity to deterioration in optical performance with respect to error in the lens element-shape becomes high whereby field curvature in the sub scanning cross section becomes high, and a large shift in the position of the image plane occurs due to a change in temperature.

Condition (4) specifies the ratio of the distance between the deflection reference point B and the image-side principal plane "I" of the image forming optical system 15 to the distance between the image-side principal plane "I" of the image forming optical system 15 and the photoconductive surface 16.

When condition (4) is satisfied, by moving the image-side principal plane "I" of the image forming optical system 15 towards the deflection reference point B, the change in a position of a scanning spot (image height) in the main scanning direction due to the temperature change can be lowered to a negligible level.

If $d_{H2}/d_{IM}$ exceeds the upper limit of condition (4), the change in the image height due to the temperature change increases.

Condition (5) specifies the refractive power, in the main scanning direction, of the rear lens group R of the image forming optical system 15. When condition (5) is satisfied, an increase of the difference between the center and peripheral thickness of the lens element of the rear lens group R (the elongated single anamorphic lens element L3) is prevented, and the worsening of processing is prevented. Furthermore, the image-side principal plane "I" of the image forming optical system 15 can be moved towards the deflection reference point B.

If $f/f_R$ exceeds the upper limit of condition (5), the image-side principal plane "I" of the image forming optical system 15 becomes distant from the deflection reference point B, so that changes in the image height due to the temperature change increase. If $f/f_R$ exceeds the lower limit of condition (5), the thickness of the periphery of the lens element extremely increases compared to the thickness of the center of the lens element, which hinders the processing with ease.

The following is a description on condition (6). It has been known that negative distortion occurs in an image forming optical system (an fθ lens element) of a scanning optical system. Therefore if the angle (absolute value) formed by the light ray of the maximum scan angle incident on a lens surface in the front lens group and the optical axis is "A," and if the angle (absolute value) formed by the light ray of the maximum scan angle emitted from the lens surface and the optical axis is "B," the relation of the two angles is usually A−B>0. On the other hand, the inventor of the present invention learns that in the image forming optical system if there is a lens surface which satisfies A−B<0, adverse influence due to the temperature change tends to be canceled, which is advantageous from the view point of temperature compensation. Furthermore, such a lens surface in which A−B<0 is satisfied is preferably positioned in the front lens group which is distant from the image plane rather than in the rear lens group which is close to the image plane, when sensitivity to optical performance and effectiveness of correction are considered.

Figure 17:
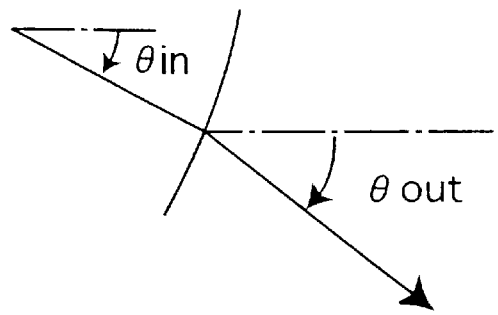
FIG. 17 shows the definition of θin and θout.

Condition (6) specifies the relation of θin and θout as the angles (absolute values) to be satisfied when θin is the angle (absolute value) formed by the light ray of the maximum scan angle incident on a lens surface in the front lens group and the optical axis, and θout is the angle (absolute value) formed by the light ray of the maximum scan angle emitted from the lens surface and the optical axis (refer to FIG. 17). In other words, when the front lens group F is provided with a lens surface satisfying θin−θout<0, and the condition is set to θin−θout<−1.5, temperature compensation can be effectively carried out. If θin−θout exceeds the upper limit of condition (6), adverse influence on temperature change is not effectively eliminated.

The following are descriptions of specific embodiments.

The dotted lines and the solid lines in the field curvature diagrams show the data for main scanning cross section and the sub-scanning cross section, respectively.

In the tables which show the numerical data, f designates the focal length of the entire image forming optical system, ω designates the maximum scan angle, L designates the wave length used, $R_Y$ designates the radius of curvature in the main scanning direction, $R_Z$ designates the radius of curvature in the sub-scanning direction, D designates the lens thickness or distance, and n designates the refractive index at a wave length used.

The surface shape of the rotationally symmetrical aspherical surface is defined by the following formula when the x-axis designates the optical axis, the y-axis designates the main scanning direction, and the z-axis designates the sub-scanning direction:

$$x = C_Y y^2/[1+[1-(1+K)C_Y^2 y^2]^{1/2}] + A4y^4 + A6y^6 + A8y^8 + \ldots$$

wherein
- x designates a distance from a tangential plane of an aspherical vertex;
- y designates a distance from the optical axis;
- $C_Y$ designates the paraxial curvature ($1/R_Y$) in the main scanning direction;
- K designates the conic coefficient; and
- Ai designates the $i^{th}$ aspherical coefficient.

Furthermore, the surface shape of the progressive power toric aspherical surface in the main scanning cross section is defined by the following when the x-axis designates the optical axis, the y-axis designates the main scanning direction, and the z-axis designates the sub-scanning direction:

$$x = C_Y y^2/[1+[1-(1+K)C_Y^2 y^2]^{1/2}] + A4y^4 + A6y^6 + A8y^8 + \ldots$$

wherein
- $C_Y$ designates the paraxial curvature ($1/R_Y$) in the main scanning direction;
- K designates the conic coefficient; and
- Ai designates the $i^{th}$ aspherical coefficient.

Figure 18:
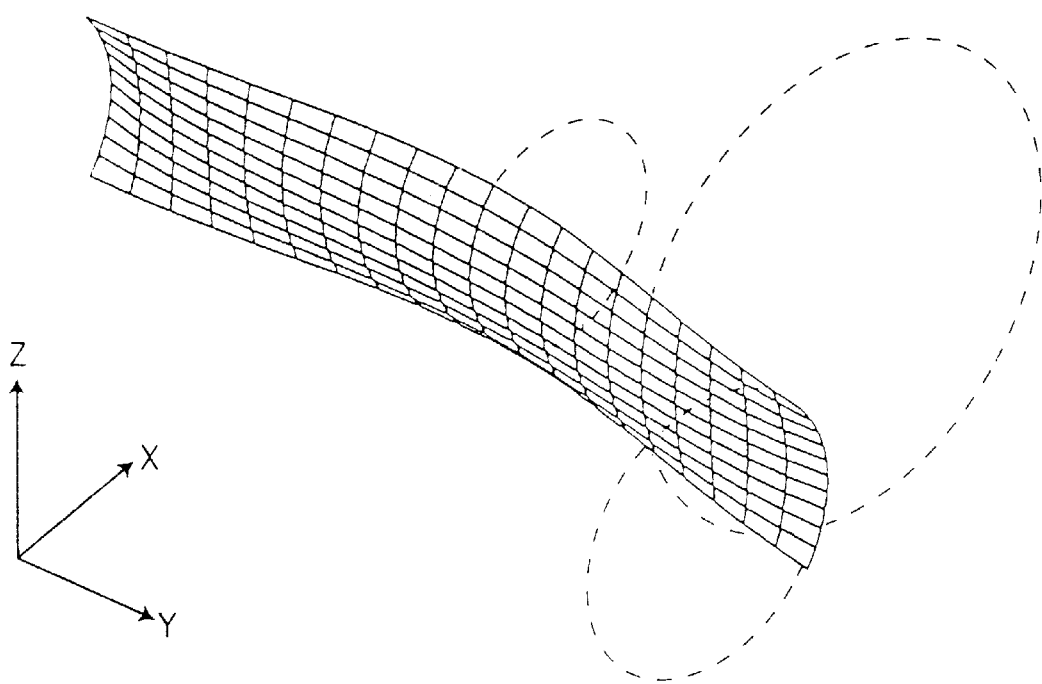
FIG. 18 is a perspective view of a progressive power toric aspherical surface.

The curvature $C_Z(Y)$ in the sub-scanning cross section is defined as:

$$C_Z(Y) = C_Z(0) + AS1y + AS2y^2 + AS3y^3 + \ldots$$

wherein
- $C_Z(0)$ designates the curvature ($1/R_Y$) in the sub-scanning cross section on the optical axis; and
- ASi designates the sub-scanning cross section curvature coefficient. In other words, a progressive power toric aspherical surface is the surface-shape wherein the radius of curvature in the sub-scanning direction is established irrespective of the cross-sectional shape in the main scanning direction, and a line connecting the center-of-curvatures in the sub-scanning direction curves in the main scanning cross section. FIG. 18 shows an example of a progressive power toric aspherical surface.

EMBODIMENT 1

Figure 3:
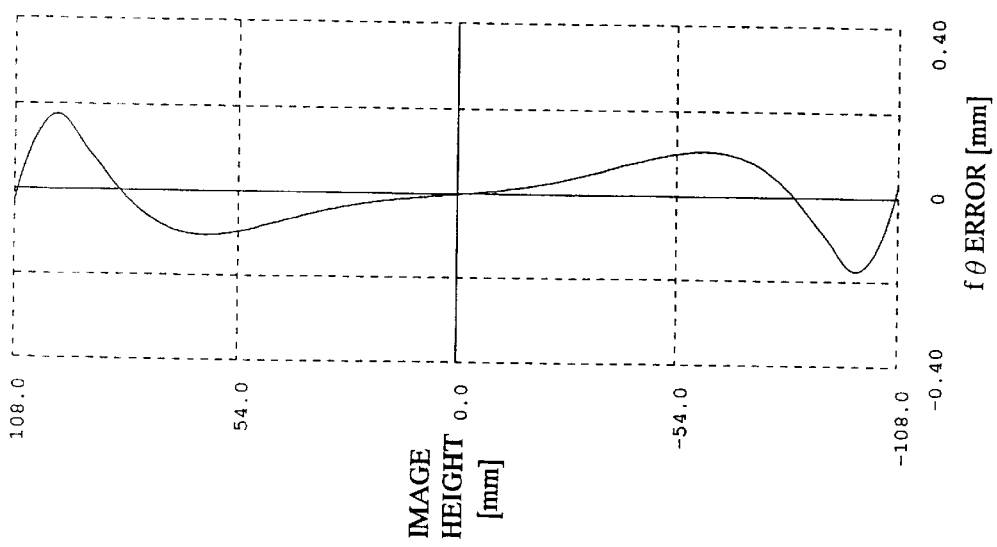
FIG. 3 shows the fθ error of the lens system in FIG. 2.

FIG. 2 is a lens arrangement of the first embodiment of the present invention. FIGS. 3 and 4 respectively show the fθ error and field curvature of the lens system in FIG. 2. FIGS. 5 and 6 show the fθ error and field curvature after a temperature change of 30° C. in the lens system of FIG. 2. Table 1 shows the numerical data thereof. The front lens group F includes a positive lens element L1 and a negative lens element L2. The rear lens group R includes an elongated anamorphic single lens element having a negative refractive power in the main scanning direction and a strong positive refractive power in the sub-scanning direction. All three lens elements are made of an optical plastic material. In the numerical data, surface Nos. 1 through 4 are of the front lens group F, and surface Nos. 5 and 6 are of the rear lens group R. The surface of the front lens group F closest to the photoconductive surface 16 is a rotationally symmetrical aspherical surface. The surface of the rear lens group R closest to the polygon mirror 14 is a progressive power toric aspherical surface. Furthermore, the surface which satisfies the condition θin−θout<0 is the second surface (surface No. 4) of the second lens element of the front lens group F.

TABLE 1

| f = 144.9 |
| ω = 42.7° |
| L = 780 nm |
| θin−θout = −4.18° (the second surface [surface No. 4] of the second lens element of the front lens group F) |

| Surface No. | $R_Y$ | $R_t$ | D | n |
|---|---|---|---|---|
| 1 | −190.08 | — | 11.00 | 1.486 |
| 2 | −48.33 | — | 2.00 | — |
| 3 | −101.63 | — | 3.00 | 1.486 |
| 4* | −105.82 | — | 83.27 | — |
| 5** | −252.82 | 19.45 | 4.00 | 1.486 |
| 6 | −1177.36 | — | — | — |

| $d_o$ = 32.0 |
| $d_{fs}$ = 51.7 |
| $f_1$ = 130.0 |
| fR = −663.2 |
| $d_{H2}$ = 42.1 |
| $d_{IM}$ = 144.9 |

*designates the aspherical surface which is rotationally symmetrical with respect to the optical axis.
**designates the progressive power toric aspherical surface.

Aspherical surface data (the aspherical surface coefficients not indicated are zero (0.00)):

| Surface No.4 | K | A4 | A6 | A8 |
|---|---|---|---|---|
| | 0.00 | $0.4673 \times 10^{-6}$ | $-0.1459 \times 10^{-9}$ | $0.4559 \times 10^{-13}$ |
| Surface No.5 | K | A4 | A6 | A8 |
| | 0.00 | $0.3278 \times 10^{-6}$ | $-0.2661 \times 10^{-10}$ | $0.1296 \times 10^{-14}$ |
| | AS1 | AS2 | AS4 | AS6 |
| | $-0.8476 \times 10^{-6}$ | $-0.2326 \times 10^{-5}$ | $0.6048 \times 10^{-10}$ | $0.4349 \times 10^{-13}$ |

EMBODIMENT 2

Figure 11:
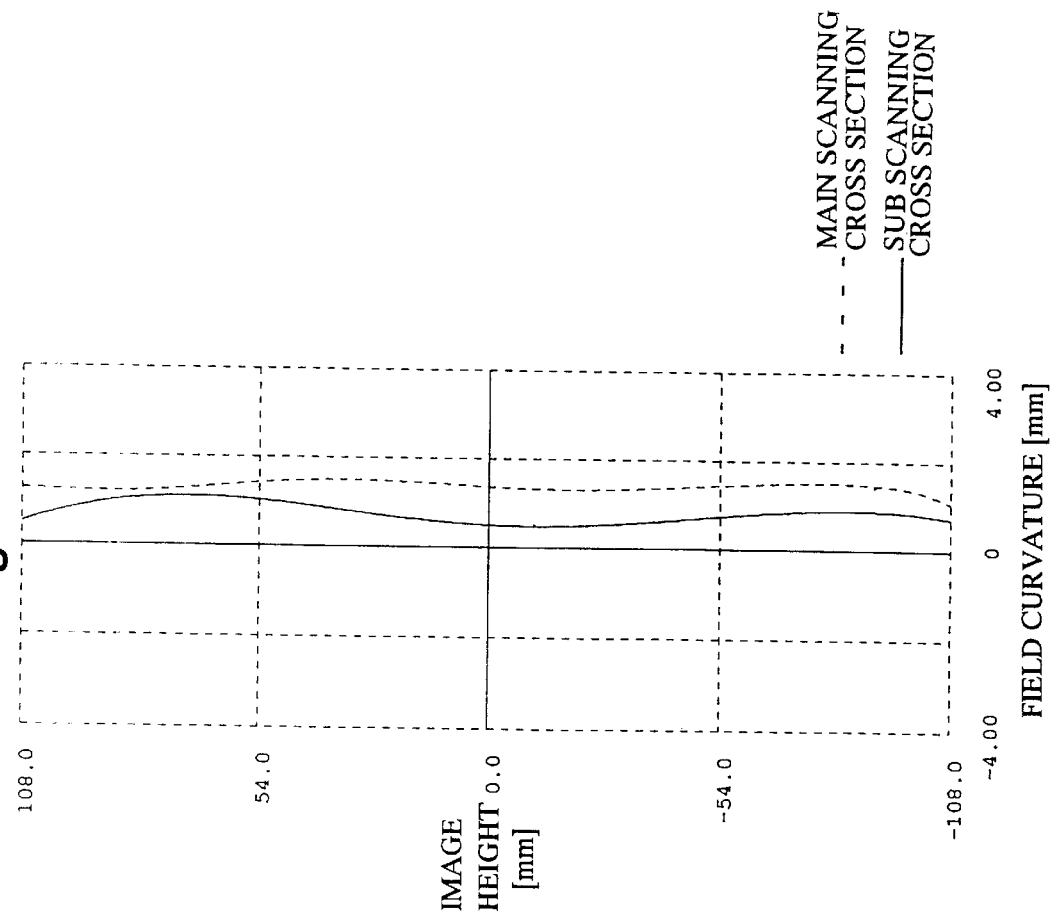
FIG. 11 shows the field curvature after a temperature change of 30° C. in the lens system of FIG. 7.
Figure 10:
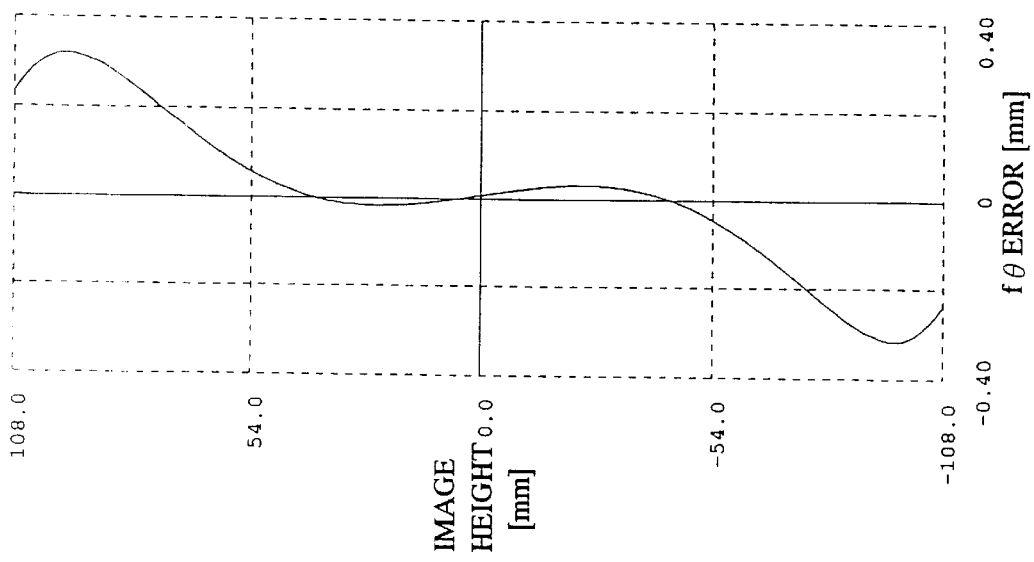
FIG. 10 shows the fθ error after a temperature change of 30° C. in the lens system of FIG. 7.

FIG. 7 is a lens arrangement of the second embodiment of the present invention. FIGS. 8 and 9 respectively show the fθ error and field curvature of the lens system in FIG. 7. FIGS. 10 and 11, corresponding to FIGS. 8 and 9, show the fθ error and field curvature after a temperature change of 30° C. in the lens system of FIG. 7. Table 2 shows the numerical data thereof. The front lens group F includes two positive lens elements L1 and L2. The rear lens group R includes an elongated anamorphic single lens element having a negative refractive power in the main scanning direction and a strong positive refractive power in the sub-scanning direction. All three lens elements are made of an optical plastic material. In the numerical data, surface Nos. 1 through 4 are of the front lens group F, and surface Nos. 5 and 6 are of the rear lens group R. The surface of the front lens group F closest to the photoconductive surface 16 is a rotationally symmetrical aspherical surface. The surface of the rear lens group R closest to the polygon mirror 14 is a progressive power toric aspherical surface. Furthermore, the surface which satisfies the equation θin−θout<0 is the second surface (surface No. 4) of the second lens element of the front lens group F.

TABLE 2 f = 179.4
ω = 34.4°
L = 780 nm
θin−θout = −1.86° (the second surface [surface No. 4] of the second lens element of the front lens group F)

| Surface No. | $R_Y$ | $R_t$ | D | n |
|---|---|---|---|---|
| 1 | −104.78 | — | 6.50 | 1.486 |
| 2 | −46.96 | — | 2.00 | — |
| 3 | −72.40 | — | 4.00 | 1.486 |
| 4* | −71.63 | — | 105.26 | — |
| 5** | −389.13 | 23.18 | 4.00 | 1.486 |
| 6 | −4762.16 | — | — | — |

$d_o = 32.0$
$d_{fB} = 65.2$
$f_1 = 168.9$
$fR = -871.9$
$d_{H2} = 39.5$
$d_{IM} = 179.4$

*designates the aspherical surface which is rotationally symmertical with respect to the optical axis.
**designates the progressive power toric aspherical surface.

Aspherical surface data (the aspherical surface coefficients not indicated are zero (0.00)):

| Surface No.4 | K | A4 | A6 | A8 |
|---|---|---|---|---|
| | 0.00 | $0.2660 \times 10^{-6}$ | $-0.1759 \times 10^{-10}$ | 0.00 |
| Surface No.5 | K | A4 | A6 | A8 |
| | 0.00 | $0.1687 \times 10^{-6}$ | $-0.6575 \times 10^{-11}$ | $0.1948 \times 10^{-15}$ |
| AS1 | | AS2 | AS4 | AS6 |
| $-0.7521 \times 10^{-9}$ | | $-0.1539 \times 10^{-5}$ | $0.5063 \times 10^{-10}$ | 0.00 |

EMBODIMENT 3

Figure 14:
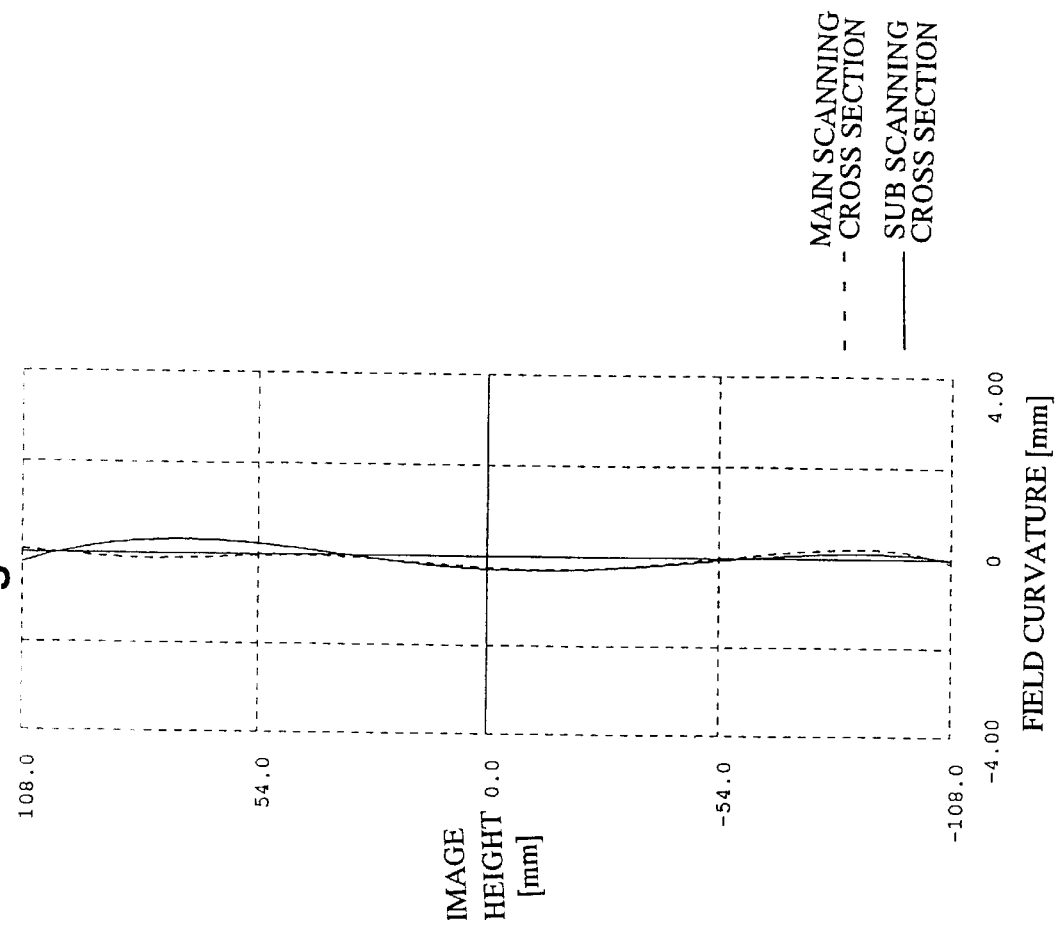
FIG. 14 shows field curvature of the lens system in FIG. 12.
Figure 13:
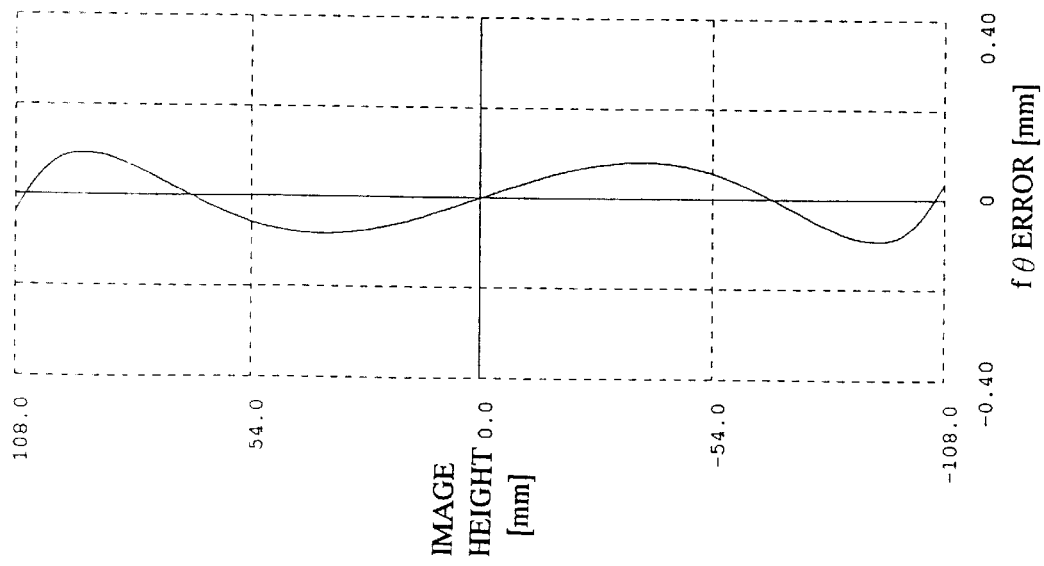
FIG. 13 shows the fθ error of the lens system in FIG. 12.

FIG. 12 is a lens arrangement of the third embodiment of the present invention. FIGS. 13 and 14 respectively show the fθ error and field curvature of the lens system in FIG. 12. FIGS. 15 and 16, corresponding to FIGS. 13 and 14, show the fθ error and field curvature after a temperature change of 30° C. in the lens system of FIG. 12. Table 3 shows the numerical data thereof. The basic lens arrangement is the same as in the second embodiment. Furthermore, the surfaces which satisfy the equation θin−θout<0 are the second surface (surface No.2) of the first lens element and the second surface (surface No. 4) of the second lens element of the front lens group F.

TABLE 3 f = 179.6
ω = 34.4°
L = 780 nm
θin−θout = −2.58° (the second surface [surface No. 2] of the first lens element of the front lens group F)
θin−θout = −2.28° (the second surface [surface No. 4] of the second lens element of the front lens group F)

| Surface No. | $R_Y$ | $R_Z$ | D | n |
|---|---|---|---|---|
| 1 | −53.65 | — | 4.00 | 27 1.486 |
| 2 | −37.46 | — | 2.00 | — |
| 3 | −54.20 | — | 3.00 | 1.486 |
| 4* | −45.93 | — | 108.60 | — |
| 5** | −391.29 | 22.32 | 4.00 | 1.486 |
| 6 | −2902.29 | — | — | — |

$d_o = 20.0$
$d_{fB} = 65.2$
$f_1 = 236.3$
$fR = -930.7$
$d_{H2} = 27.0$
$d_{IM} = 179.6$

*designates the aspherical surface which is rotationally symmertical with respect to the optical axis.
**designates the progressive power toric aspherical surface.

Aspherical surface data (the aspherical surface coefficients not indicated are zero (0.00)):

| Surface No.4 | K | A4 | A6 | A8 |
|---|---|---|---|---|
| | 0.00 | $0.4712 \times 10^{-6}$ | $-0.4228 \times 10^{-9}$ | 0.00 |
| Surface No.5 | K | A4 | A6 | A8 |
| | 0.00 | $0.2137 \times 10^{-6}$ | $-0.1164 \times 10^{-10}$ | $0.3854 \times 10^{-14}$ |
| AS1 | | AS2 | AS4 | AS6 |
| $0.4385 \times 10^{-7}$ | | $-0.1963 \times 10^{-5}$ | $0.7358 \times 10^{-10}$ | 0.00 |

Table 4 shows the numerical data for each condition of each embodiment.

TABLE 4

| | Embodiment 1 | Embodiment 2 | Embodiment 3 |
|---|---|---|---|
| Condition (1) | 0.221 | 0.178 | 0.111 |
| Condition (2) | 1.115 | 1.062 | 0.760 |
| Condition (3) | 0.357 | 0.363 | 0.362 |
| Condition (4) | 0.291 | 0.220 | 0.150 |
| Condition (5) | −0.218 | −0.206 | −0.192 |
| Condition (6) | −4.18 | −1.86 | −2.58;−2.28 |
| Rate of Change of Scanning Width | 0.319 | 0.239 | 0.191 |

The rate of change of the scanning width shown above indicates the change in the scanning width when the temperature changes by 30° C. and is defined by the equation $\{(W_H-W_{RT})/W_{RT}\} \times 100$; wherein $W_{RT}$ designates the scanning width at a reference temperature; $W_H$ designates the scanning width at a temperature which is 30° C. greater than the reference temperature.

As can be understood from Table 4, each embodiment satisfies conditions (1) through (6); and as shown in the drawings, the various aberrations, in particular distortion, are satisfactorily corrected.

According to the above discussion, an image forming optical system of a scanning optical system in which performance deterioration due to the temperature change can be prevented while only using resin-made lens elements can be obtained.

What is claimed is:

1. A scanning optical system in which a bundle of rays emitted from a light source scans a surface to be scanned through an optical deflector and an image forming optical system, said image forming optical system comprising:

a positive front lens group comprising two lens elements; and a rear lens group comprising an elongated single anamorphic lens element positioned in the vicinity of said surface to be scanned and having a positive refractive power in a sub scanning direction;

wherein all of said lens elements in the image forming optical system are made of a resin material, and wherein said scanning optical system satisfies the following conditions:

$$d_0/f < 0.23$$

$$0.70 < f/f_1 < 1.30$$

$$d_{fB}/f < 0.50$$

wherein f designates the focal length of said image forming optical system in a main scanning direction;

$f_1$ designates the focal length of the first lens element of said front lens group;

$d_0$ designates the distance from the intersecting point of a central axis of said bundle of rays being emitted from said light source and incident on said optical deflector and an optical axis of said image forming optical system to the first lens surface, on the side of said optical deflector, of said image forming optical system; and $d_{fB}$ designates the distance between said photoconductive surface and the last lens surface, closest to said surface to be scanned, of said rear lens group.

2. The scanning optical system according to claim 1, wherein said scanning optical system further satisfies the following condition:

$$d_{H2}/d_{IM} < 0.35$$

wherein $d_{H2}$ designates the distance from the intersecting point of said central axis of said bundle of rays being emitted from said light source and incident on said optical deflector and the optical axis of said image forming optical system to an image-side principal plane of said image forming optical system; and $d_{IM}$ designates the distance between the image-side principal plane of said image forming optical system and said photoconductive surface.

3. The scanning optical system according to claim 1, wherein all of the lens surfaces of said front lens group are rotationally symmetrical about the optical axis thereof.

4. The scanning optical system according to claim 1, wherein the following condition is satisfied:

$$-0.25 < f/f_R < 0$$

wherein $f_R$ designates the focal length of said rear lens group in the main scanning direction.

5. A scanning optical system according to claim 1, wherein at least one lens surface of said front lens group is formed as an aspherical surface in a main scanning cross section.

6. The scanning optical system according to claim 1, wherein said two lens elements of said front lens group both comprise positive lens elements.

7. A scanning optical system according to claim 1, wherein said two lens elements of said front lens group comprise a positive lens element and a negative lens element.

8. A scanning optical system according to claim 1, wherein at least one lens surface in said front lens group satisfies the following condition:

$$\theta in - \theta out < -1.5°$$

wherein

θin designates the absolute value of an angle (absolute value) formed by the light ray of the maximum scan angle incident on said at least one lens surface in said front lens group and the optical axis; and θout designates the absolute value of an angle formed by the light ray of the maximum scan angle emitted from said lens surface and the optical axis.

* * * * *